United States Patent [19]

Noll

[11] 4,030,358

[45] June 21, 1977

[54] PORTABLE AIR VELOCITY MEASURING UNIT

[75] Inventor: Robert W. Noll, Santa Rosa, Calif.

[73] Assignee: Cambridge Filter Corporation, Syracuse, N.Y.

[22] Filed: Nov. 10, 1975

[21] Appl. No.: 630,419

[52] U.S. Cl. ............................................. 73/212
[51] Int. Cl.² ...................... G01F 1/00; G01F 1/46
[58] Field of Search ................................... 73/212

[56] References Cited

UNITED STATES PATENTS

| | | | |
|---|---|---|---|
| 1,145,860 | 7/1915 | Burnham | 73/212 |
| 2,342,290 | 2/1944 | Miller | 73/212 X |
| 3,581,565 | 6/1971 | Dieterich | 73/212 |
| 3,733,900 | 5/1973 | De Baun | 73/212 |

FOREIGN PATENTS OR APPLICATIONS

| | | | |
|---|---|---|---|
| 724,276 | 2/1955 | United Kingdom | 73/212 |

Primary Examiner—Richard C. Queisser
Assistant Examiner—John P. Beauchamp
Attorney, Agent, or Firm—Charles S. McGuire

[57] ABSTRACT

A unit for measurement of the velocity of air flowing into or out of an opening such as the heating or air conditioning register or grill. An open end of a collecting section is placed over the opening and the air flows through a measuring section at the opposite end of the chamber. The measuring section includes a pair of hollow manifold tubes each having a smaller diameter, hollow sensing tube mounted coaxially therein. Air flows into a plurality of probes communicating with the interior of one manifold tube, into the associated sensing tube, through a velocity meter, through the other sensing tube into the other manifold tube, and out through a second plurality of probes also positioned at the opposite end of the collecting section. An orifice or constriction in the line leading to the flow meter inlet controls the flow and allows for full scale deflection of the meter within a selected range to permit accurate calibration.

10 Claims, 7 Drawing Figures

PORTABLE AIR VELOCITY MEASURING UNIT

BACKGROUND OF THE INVENTION

The present invention relates to air velocity measurement and, more specifically to portable units for measuring the velocity of air entering or leaving outlets of heating, ventilating or air conditioning systems.

In order to achieve a desired balance of air discharged from, or exhausted into, the diffusers, registers, grills or other such openings in a heating, ventilating or air conditioning system it is necessary to measure the velocity of air entering or leaving each such opening. So-called balancing hoods are commonly provided to measure air flow through openings by placing an open end of the hood over the opening in sealing relation to the surrounding surface. All air flowing through the opening is thus forced to pass through flow measuring apparatus associated with the hood. Often the apparatus senses the total pressure developed by the air flowing through the hood, or measure the velocity at one point in the hood, and from this provides a scale reading in flow rate proportioned to the pressure or flow. The balancing hoods are intended to be hand-held over the openings through which flow is being measured and are therefore lightweight and portable in construction. However, such units are rarely of a reliably high degree of accuracy and, at least, represent only a close approximation of the actual velocity or quantity of air flowing through the opening.

It is a principal object of the present invention to provide a portable device for measuring air flow through a vent opening with a high degree of accuracy and reliability.

A further object is to provide portable air flow measuring apparatus wherein air flow is sampled at a plurality of positions distributed over a cross section of the flow path and measured in a manner providing a true indication of total air flow.

Another object is to provide air flow measuring equipment which advantageously employs averaging principles previously used in permanently installed pressure measuring systems in a portable, lightweight, air flow collecting and velocity measuring device.

Other objects will in part be obvious and will in part appear hereinafter.

SUMMARY OF THE INVENTION

In accordance with the foregoing objects, the device of the invention includes an air collecting section comprising a continuous wall, converging from a first open end to a second open end upon which a measuring section is mounted. The measuring section also includes an open-ended wall section, of uniform cross section, wherein a plurality of hollow manifold tubes and sensing probes are supported. A first group of sensing probes are arranged with their open ends facing in the direction of the collecting section and communicate with one or more hollow manifold tubes extending laterally across the measuring section wall. A second group of probes are positioned with their open ends directed oppositely to those of the first group and communicate with one or more separate manifold tubes, mounted within the measuring section in parallel relation to the first-mentioned manifold tubes.

Coaxially mounted within each manifold tube is a sensing tube having a series of openings through the wall thereof along the length of the tube, successive openings preferably being disposed at 90° around the periphery of the tube. One end of each sensing tube extends through the end of its associated manifold tube and through wall of the measuring section for connection to the measuring instrument. If more than one manifold and sensing tube is provided for each group of probes, the ends of the sensing tubes extending through the measuring section wall are connected by a cross tube. The meter is a conventional device through which air flows from an inlet to an outlet opening, deflecting a pointer proportionately to the quantity of air flowing therethrough.

Air flow in either direction through the device may be measured depending on the connection of the meter to the sensing tubes associated with the two groups of probes. In either case, a flow restricting orifice may be placed in the fitting connecting the meter to the sensing tubes associated with the manifold having probes directed toward the collecting section. The size of the orifice is proportioned to the range of flow rates to be measured in order to achieve greater accuracy by causing flow through the meter to utilize the full range of deflection of the pointer.

DETAILED DESCRIPTION

Figure 1:
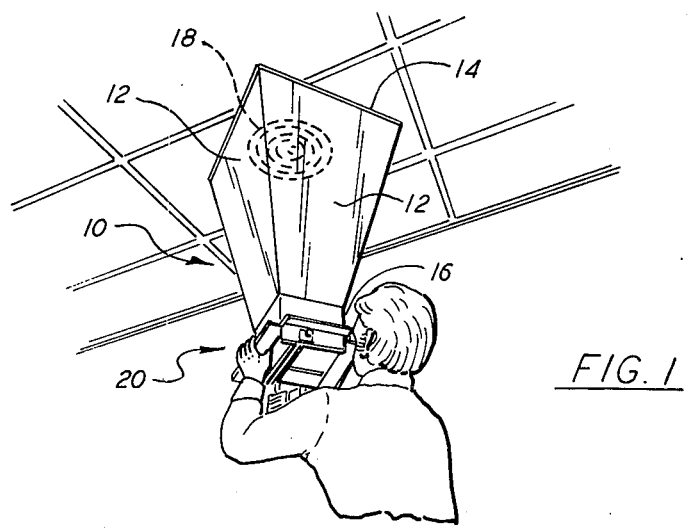
FIG. 1 is a perspective view of the apparatus of the invention being positioned by an operator for making an air velocity measurement.

The apparatus of the invention is lightweight and preferably collapsible into a compact, folded position for ease of transport. As seen in FIG. 1, the apparatus includes a collecting section 10, having four side members 12 joined along their side edges to form a continuous chamber, open at both ends and converging from one end 14 to the other 16. A gasket of foam rubber, or the like, is preferably provided around the periphery of end 14, which contacts the ceiling, wall, or other surface surrounding an opening 18, into or out of which the air flow is to be measured. In order to provide the aforementioned collapsible feature, walls 12 are releasably joined along their side edges by plastic strips having grooves or channels for frictionally receiving adjacent side edges of two walls. This feature, although desirable, is not critical to the construction or employment of the apparatus of the invention.

Mounted upon smaller end 16 of collecting section 10, and of like cross section, is measuring section 20. Rectangular wall 22 is open at both ends, one of which communicates directly with open end 16 of section 10. Extending across and secured to opposite side portions of wall 22 is a first pair of hollow manifold tubes 24, secured to each end to opposite sides of wall 22. Adjacent and parallel to each of tubes 24, on the side thereof opposite end 14 of the collecting section, is a second pair of hollow manifold tubes 26, one of which is seen in each of FIGS. 6 and 7, the other being similarly disposed with respect to the opposite tube 24. Coaxially secured within each of the first pair of manifold tubes is a sensing tube 28. Likewise, a sensing tube 30 is mounted within each of the second pair of manifold tubes 26. Sensing tubes 28 and 30 include openings 32 and 34, respectively, through the walls thereof at evenly spaced intervals along their length, successive openings being disposed at 90° around the tube peripheries.

Figure 2:
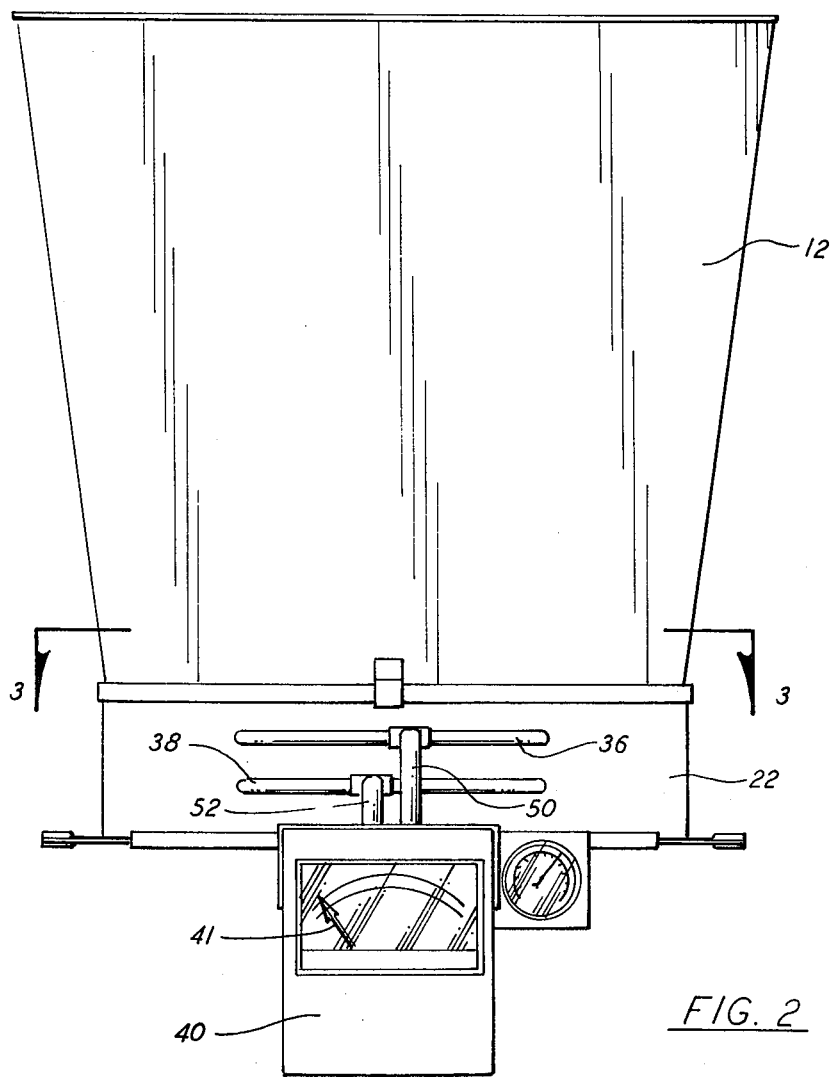
FIG. 2 is a side elevational view of the apparatus of FIG. 1.
Figure 3:
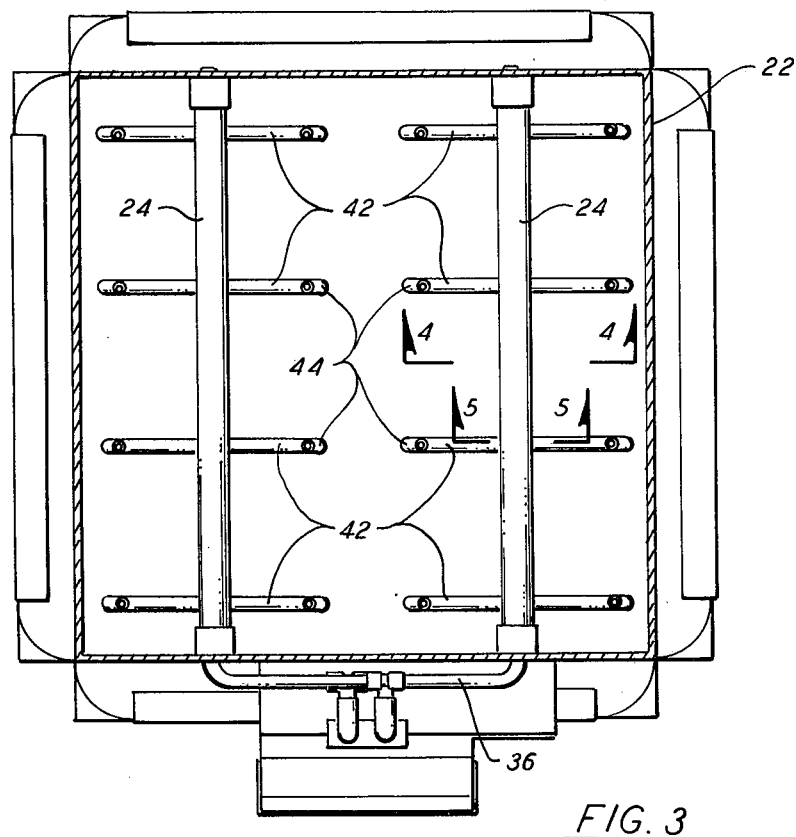
FIG. 3 is a plan view in section on the line 3—3 of FIG. 2.
Figure 4:
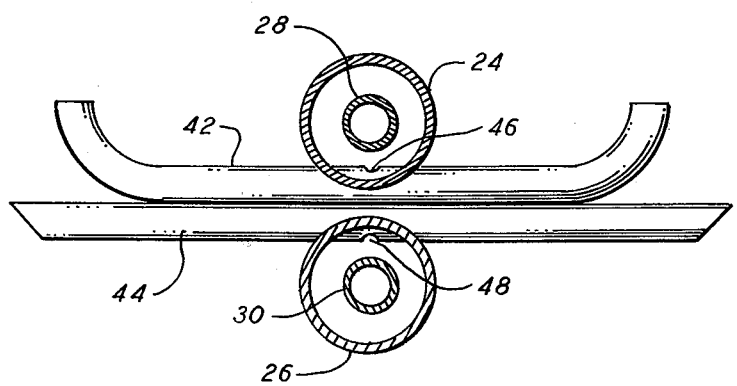
FIGS. 4 & 5 are enlarged elevational views in section on the lines 4—4 and 5—5, respectively, of FIG. 3.
Figure 5:
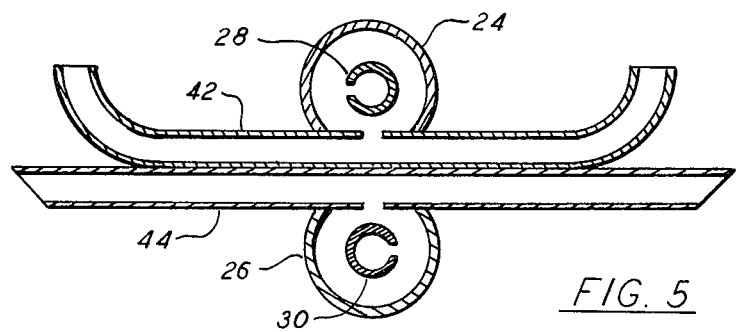
Figure 6:
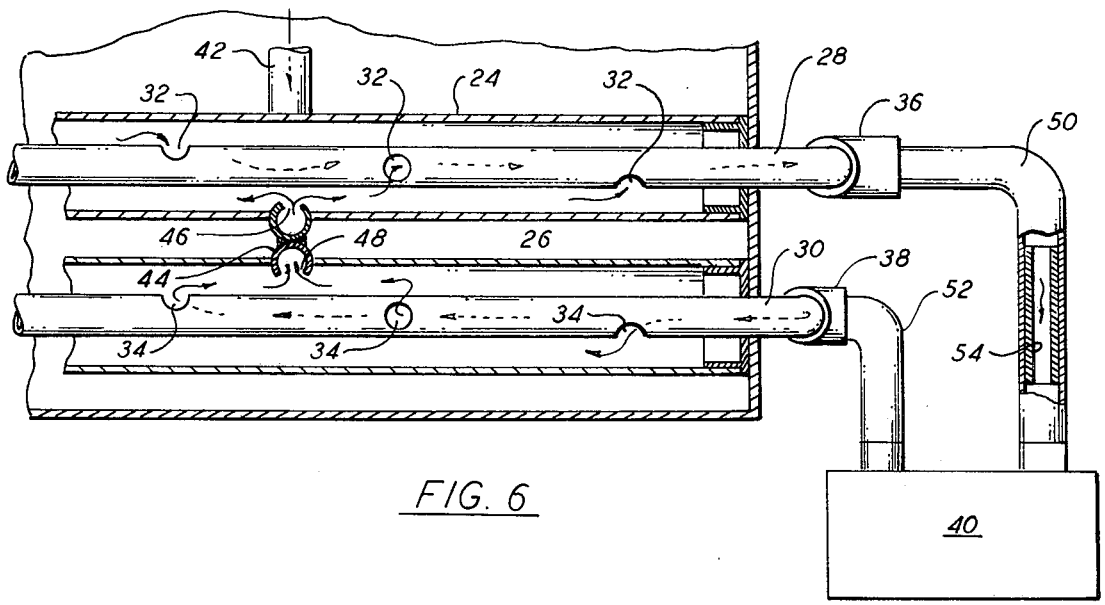
FIG. 6 is a fragmentary, elevational view, partly in section, illustrating the connection of the apparatus to the measuring instrument when measuring the velocity of air flowing in one direction.
Figure 7:
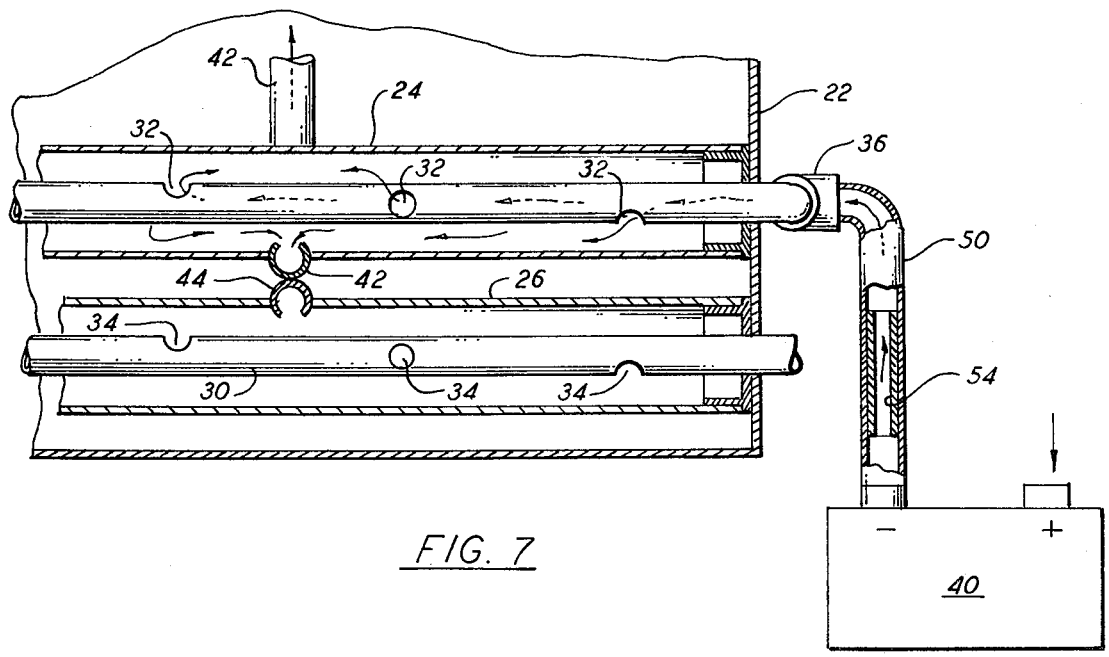
FIG. 7 is a view identical to FIG. 6, illustrating the connection for measuring air velocity in the opposite direction.

Each of tubes 28 and 30 extends from one end of its associated manifold tube, through the opposite end and through the side of wall 22 adjacent thereto, as seen in FIGS. 6 & 7. The ends of tubes 28 and 30 outside wall 22 are joined by hollow cross tubes 36 and 38, respectively, as shown in FIG. 2, when more than one manifold set is required. A conventional air velocity meter 40 includes the usual internal mechanism for deflecting dial pointer 41 in proportion to the quantity of air flowing through the meter from an inlet to an outlet opening. The inlet and outlet openings of the fragment of meter 40 shown in FIGS. 6 & 7 are respectively indicated by positive and negative signs.

A plurality of double-ended probes 42 are connected at their midpoints to each of manifold tubes in the manner described in copending application Ser. No. 580,152, of Carl J. Bauder, filed May 23, 1975, and assigned to applicant's assignee, now U.S. Pat. No. 3,981,192. Briefly stated, the manifold tubes are provided with openings of suitable size and shape to accommodate a medial wall portion of the smaller diameter probe tubes. A soldered or other airtight connection seals the probes to the manifolds about the periphery of the openings in the latter. Probes 42 communicate with the interior of manifold tubes 24 through small opening 46 at the mid-point between the ends of the probe. Small opening 48 likewise provides communication between the interiors of each of probes 44 and manifold tubes 26.

Both ends of all probes are open, those of probes 42 being bent to face in the direction collecting section 10. The open ends of probes 44 face in the opposite direction, being cut in a plane approximately 45° to the axis of the probe tubes. The tubes of measuring section 20 are connected to meter 40 in the manner illustrated in FIG. 6 to measure the quantity of air flowing out of opening 18, i.e., air flowing from collecting section 10 through measuring section 20. The quantity of air flowing into opening 18, i.e., through measuring section 20 into collecting section 10 and thence into the opening covered thereby, is measured by connecting meter 40 as illustrated in FIG. 7. In the former case, the inlet opening of meter 40 is connected to cross tube 36 by fitting 50 and the outlet side of the meter is connected by fitting 52 to cross tube 38. Air flowing out of opening 18 is directed through collecting section 10 into measuring section 20. A portion of such air enters the open ends of probes 42 at the plurality of points spaced throughout the cross-section of the measuring section at which each probe end is positioned.

As seen in FIG. 6, air flowing into probes 42 enters manifold tubes 24 through small openings 26 in the probes. The air may then flow along the interior of the manifold tubes and enter sensing tubes 28 through openings 32 therein. The air flowing through each of tubes 28 is discharged into cross tube 36, flows through fitting 50 and into meter 40. Air leaving meter 40 through the outlet opening flows through fitting 52, cross tube 38, sensing tubes 30, manifold tubes 26, and is discharged in the downstream direction through the ends of probes 44. In passing through meter 40 the air deflects pointer 41 to an extent proportional to the velocity of the air and an appropriate scale adjacent the pointer provides a direct reading of the air flow in the units to which the meter and scale are calibrated. For example, the reading may indicate air velocity in units such as feet per second, or may indicate the quantity of air flow through the opening covered by end 14 of the collecting section in units such as cubic feet per minute. The oppositily facing openings of probes 42 and 44 result in a higher flow rate through the meter than would be obtained if only one probe facing into the air flow were used thereby providing greater range and accuracy at low flow rates.

In order to measure the air flow into opening 18, i.e., "return air" in a ventilating system, or the like, meter 40 is connected to measuring section 20 as illustrated in FIG. 7. The outlet side of the meter is connected by fitting 50 to cross tube 36. Room air flows into the inlet opening of the meter and through the meter, fitting 50, cross tube 36, sensing tubes 28, manifold tubes 24, and is discharged into measuring section 20 through the open ends of probes 42. In this case, there is no flow through sensing tubes 30, manifold tubes 26 or probes 44. The reading is taken in the same manner as when measuring supply air flow, but a differently calibrated scale is used.

In order to provide greater accuracy over a wider range of air flows, orifice tube 54 may be provided in fitting 50. The orifice tube merely comprises a short section of tubing having an inside diameter smaller than that of fitting 50, thereby forming a constriction of predetermined cross section in the flow path. Preferably, orifice tube 54 is selectively removable from fitting 50, and a plurality of different sized orifice tubes may be provided for selective use when measuring flow rates within different ranges. For example, flow rate within a low range may be sufficient to provide a full range of scale deflection of the pointer without the use of a separate orifice tube, while a higher range of flow rates may provide full scale deflection when a flow restricting orifice is inserted. In production, it is preferable that the meter be calibrated and used with a particular measuring section rather than interchanging meters and measuring sections which have not been conjointly calibrated.

What is claimed is:

1. A portable unit for measuring the velocity of an air stream flowing into or out of an opening, said unit comprising:
   a. a wall section defining a path for air flow between first and second open ends;
   b. at least two hollow manifold tubes, closed at both ends, extending transversely across said second open end of said wall section;
   c. at least two hollow sensing tubes respectively mounted coaxially within said manifold tubes, and extending through one end thereof, each of said sensing tubes having a plurality of openings through the walls thereof within said manifold tubes for air flow between the interiors of said manifold and sensing tubes;
   d. a first plurality of probes having open ends facing said first open end at preselected locations in a first plane adjacent and transverse to said second open end, and communicating with the interior of one of said manifold tubes;

e. a second plurality of probes having open ends facing away from said first open end at preselected locations in second plane adjacent and transverse to said second open end, and communicating with the interior of the other of said manifold tubes, said second plane being closely adjacent to and closer to said second open end than said first plane, the number of said first probe open ends being equal to the number of said second probe open ends;

f. an air flow velocity meter having an inlet and an outlet, and means movable in proportion to the velocity of air flowing from said inlet to said outlet; and g. means for selectively connecting either of said inlet and outlet in communication with either of said sensing tubes.

2. The invention according to claim 1 wherein the end of said sensing tubes extending through said one end of said manifold tubes extends through said wall section for connection to said meter externally of said path defined by said wall section.

3. The invention according to claim 1 wherein said connecting means include means defining a flow-restricting orifice of predetermined size.

4. The invention according to claim 1 wherein said first and second pluralities of probes each comprise a double-ended, hollow tube, of significantly smaller diameter than said manifold tubes, having an opening substantially midway between the ends thereof through which the interiors of said probe and manifold tubes communicate.

5. The invention according to claim 4 wherein at least the medial portion of each of said probes, which includes said opening, is arranged on an axis mutually perpendicular to said manifold tubes and the major axis of air flow through said wall section.

6. The invention according to claim 5 wherein both end portions of each of said first plurality of probes are bent at substantially 90° with respect to the axis of said medial portion.

7. The invention according to claim 5 wherein each of said second plurality of probes lies entirely on a linear axis, the edges defining the open ends thereof lying in planes diverging at approximately 45° from the transverse centerline of said wall section toward said first open end.

8. The invention according to claim 7 wherein said manifold tubes are mounted within said wall section in parallel, superposed relation, the manifold tube with which said first plurality of probes communicate being closest to said first open end of said wall section.

9. The invention according to claim 3 wherein said orifice defining means is selectively removable from said connecting means.

10. The invention according to claim 1 wherein an open end of one of said second plurality of probes is located closely adjacent an open end of each of said first plurality of probes.

* * * * *